United States Patent [19]
Ishiguro et al.

[11] Patent Number: 5,688,890
[45] Date of Patent: Nov. 18, 1997

[54] THERMOPLASTIC POLYURETHANE COMPOSITION

[75] Inventors: Michihiro Ishiguro; Tatuya Oshita; Hiroyuki Ono; Kimio Nakayama; Koji Hirai, all of Kurashiki, Japan

[73] Assignee: Kuraray Co., Ltd., Kurashiki, Japan

[21] Appl. No.: 356,318

[22] PCT Filed: Apr. 28, 1994

[86] PCT No.: PCT/JP94/00717

§ 371 Date: Dec. 29, 1994

§ 102(e) Date: Dec. 29, 1994

[87] PCT Pub. No.: WO94/25529

PCT Pub. Date: Nov. 10, 1994

[30] Foreign Application Priority Data

Apr. 29, 1993 [JP] Japan ................................. 5-128406
Apr. 29, 1993 [JP] Japan ................................. 5-128407

[51] Int. Cl.$^6$ ..................... C08G 18/08; C08G 18/22; C08G 18/24
[52] U.S. Cl. ..................... 528/51; 528/56; 528/58; 528/83; 525/440; 525/453
[58] Field of Search ..................... 525/440, 453; 528/83, 51, 58, 56; 428/423.1

[56] References Cited

U.S. PATENT DOCUMENTS

| | | | |
|---|---|---|---|
| 3,929,732 | 12/1975 | Shah | 260/75 NK |
| 4,000,117 | 12/1976 | Shah | 260/75 NK |
| 4,837,245 | 6/1989 | Streu et al. | 521/117 |
| 5,070,172 | 12/1991 | Hirai et al. | 528/76 |
| 5,310,852 | 5/1994 | Hirai et al. | 528/83 |

FOREIGN PATENT DOCUMENTS

| | | |
|---|---|---|
| 0 044 969 | 2/1982 | European Pat. Off. . |
| 0 544 912 | 6/1993 | European Pat. Off. . |
| 2 237 924 | 2/1975 | France . |
| WO 92/19800 | 11/1992 | WIPO . |

OTHER PUBLICATIONS

Die Angewandte Makromolekulare Chemie, vol. 160, pp. 1–15, May 1988, Werner Mormann, et al., "Solvolytic Degradation of Aliphatic Polyesteroligomers: Poly(Tetramethylene Adipate) Diol".

Chemical Abstracts, vol. 110, No. 7, Apr. 3, 1989, AN 116432M, JP-A-63 207 809, Aug. 29, 1988.

*Primary Examiner*—Paul J. Thibodeau
*Assistant Examiner*—Mary Critharis
*Attorney, Agent, or Firm*—Oblon, Spivak, McClelland, Maier & Neustadt, P.C.

[57] ABSTRACT

A thermoplastic polyurethane composition comprises a thermoplastic polyurethane and a tin compound. The tin compound is contained in an amount of 0.3 to 15 ppm as converted into tin atom based on the thermoplastic polyurethane. The thermoplastic polyurethane composition has a retention ratio of long-chain hard segments when melt treated at 220° C. for 60 minutes of at least 85%. The thermoplastic polyurethane composition also has a retention ratio of inherent viscosity when melt treated at 220° C. for 6 minutes and then melt extruded and, thereafter, allowed to stand at 20° C., 60% RH (relative humidity) for 24 hours of at least 85%. The thermoplastic polyurethane composition has excellent mold-ability and gives molded products being excellent in tensile strength and elongation, heat resistance, compression set, resistance to hydrolysis and like properties, and are hence useful as a raw material for various items. The thermoplastic polyurethane composition also has excellent spinnability and gives fibers having excellent hot water resistance, resistance to hydrolysis, unwindability and like properties, and are hence also useful as a material for elastic fibers.

18 Claims, 1 Drawing Sheet

FIG. 1

THERMOPLASTIC POLYURETHANE COMPOSITION

BACKGROUND OF THE INVENTION

1. Field of the Invention

The present invention relates to thermoplastic polyurethane compositions having excellent moldability and being capable of minimizing the decrease of the molecular weight of molded articles therefrom, which decrease would otherwise deteriorate their properties, whereby the molded articles have excellent properties such as tensile strength and elongation, compression set, heat resistance and resistance to hydrolysis, and to a process for producing the same. The present invention further relates to a polymer diol composition to be used for the above thermoplastic polyurethane compositions and to a process for producing the same. The present invention still further relates to molded articles and elastic fibers obtained from the above thermoplastic polyurethane compositions and processes for producing the same.

2. Description of the Prior Art

Upon manufacture of thermoplastic polyurethanes, various polymer diols are used as the raw material for constituting their soft segments and these diols include polyester diols, polyesterpolycarbonate diols, polycarbonate diols and polyether diols. Among these diols, polyester diols are most widely used, since they give thermoplastic polyurethanes having excellent mechanical properties.

Ester-based polymer diols, such as polyester diols, polycarbonate diols and polyesterpolycarbonate diols are generally produced by polycondensing an dicarboxylic acid or its ester-forming derivatives such as esters or anhydrides thereof and a short-chain diol by direct esterification or transesterification, or by subjecting a lactone to ring-opening polymerization. Titanium-based compounds, having high catalytic activity, are widely used as catalysts (esterification catalyst) for these esterifications, including direct esterification, transesterification and ring-opening polymerization, to produce these ester-based polymer diols.

Thermoplastic polyurethanes are obtained by subjecting to urethanization one of the above polymer diols, together with an organic diisocyanate such as 4,4'-diphenylmethane diisocyanate or naphthalene diisocyanate and a chain extender of a short-chain diol such as 1,4-butanediol.

However, thermoplastic polyurethanes obtained by conducting melt polymerization using an ester-based polymer diol having been obtained with a titanium compound catalyst, while the activity of the catalyst was not permitted to decrease after the polymer preparation, have insufficient uniformity in their properties, such as heat resistance and resistance to hydrolysis. Molded articles obtained by melt molding, such as injection molding or extrusion molding, of these polyurethanes are therefore inferior in such properties. There are also available thermoplastic polyurethanes obtained by melt polymerization of an ester-based polymer diol having been obtained with a titanium compound catalyst, which is then subjected to an activity-decreasing treatment. These polyurethanes will, upon melt molding thereof, tend to give molded articles sticking together. In this case also, the obtained molded articles tend to become inferior in tensile strength, elongation, compression set, heat resistance and like properties.

The mechanisms involved in the above cases were studied by the present inventors and found to be as follows.

With the above former type of thermoplastic polyurethanes, during melt polymerization and melt molding thereof, the ends of short-chain diols formed by scission of the inside of the hard segments and the ends of other short-chain diols formed by scission of the inside of the soft segments originating from the polymer diol used undergo transesterification, whereby the blocks become no longer distinct from each other (that is, local randomization occurs) and, as a result, the properties of the thermoplastic polyurethanes and molded articles therefrom become non-uniform and inferior.

With the above latter type of thermoplastic polyurethanes, the urethanization reactivity decreases between the isocyanate groups and hydroxyl groups dissociated due to scission of the inside of the hard segments during melt molding, so that in the molded articles obtained the polyurethane can hardly recover the molecular weight and, as a result, these molded articles stick together or decrease their properties.

Accordingly, the present inventors have found that, in order to improve the above drawbacks it is important to maintain, during melt polymerization and melt molding, as unchanged as possible the chain length distribution of hard segments contained in a thermoplastic polyurethane and to permit the thermoplastic polyurethane molecules of articles molded therefrom to recover the molecular weight as quickly as possible after the molding.

As a result of a further study made by the present inventors, it has been found that the active titanium-based esterification catalyst remaining in the obtained polymer diol also develops catalytic activity for urethanization reaction in the succeeding melt polymerization zone for obtaining a thermoplastic polyurethane. Consequently, where the polymer diol is, after the activity of the titanium compound catalyst for esterification has been decreased, used for melt polymerization to produce a thermoplastic polyurethane, the resulting polyurethane has more uniform properties compared to one obtained with the activity of the catalyst having been not decreased. However, in this case, the productivity of the thermoplastic polyurethane necessarily decreases. Furthermore, upon melt molding of such a polyurethane, where the reactivity between the isocyanate groups and hydroxyl groups formed by dissociation during the melt molding decreases, the molecular weight of the polyurethane present in molded articles therefrom will not be sufficiently recovered and hence, as described above, sticking of molded articles, decrease in their properties and like troubles occur.

Accordingly, an object of the present invention is to provide a polyurethane composition having excellent moldability and being capable of giving molded articles with which the properties have been decreased, due to decrease in the molecular weight, only to a small extent and which have excellent properties such as tensile strength and elongation, compression set, heat resistance and resistance to hydrolysis.

Another object of the present invention is to provide a process for producing the above thermoplastic polyurethane composition in a high productivity and uniformly.

Still another object of the present invention is to provide a polymer diol composition useful as a raw material for producing the above thermoplastic polyurethane composition and a process for producing the same.

Yet another object of the present invention is to provide a molded article comprising the above thermoplastic polyurethane composition and a process for producing the same.

Yet another object of the present invention is to provide an elastic fiber comprising the above thermoplastic polyurethane composition and a process for producing the same.

SUMMARY OF THE INVENTION

The present invention provides a thermoplastic polyurethane composition comprising:

a thermoplastic polyurethane (I) comprising a polymer diol component (A), an organic diisocyanate component (B) and a chain extender component (C), and a tin compound (II) in an amount of 0.3 to 15 ppm as converted into tin atom based on said thermoplastic polyurethane (I);

said thermoplastic polyurethane composition having:

a retention ratio of long-chain hard segments containing at least 3 repeating units consisting of one unit from said organic diisocyanate and one unit from said chain extender and contained in said thermoplastic polyurethane (I), when said polyurethane composition is melt treated at 220° C. for 60 minutes of at least 85%, and a retention ratio of inherent viscosity when said polyurethane composition is melt treated at 220° C. for 6 minutes and then melt extruded and, thereafter, allowed to stand at 20° C., 60% RH (relative humidity) for 24 hours, of at least 85%. [hereinafter this thermoplastic polyurethane composition is referred to as "thermoplastic polyurethane composition (III)].

The present invention further provides a process for producing thermoplastic polyurethane compositions, which comprises conducting melt polymerization of a polymer diol obtained by affecting polymerization with a titanium-based esterification catalyst and then decreasing the activity of said titanium-based esterification catalyst, with an organic diisocyanate and a chain extender, in the presence of a tin compound.

The present invention still further provides a polymer diol composition obtained by a process which comprises polymerizing a diol with a titanium-based esterification catalyst and then decreasing the activity of said titanium-based esterification catalyst, to produce a polymer diol, and then adding a tin compound to the obtained polymer diol.

The present invention yet further provides a process for producing polymer diol compositions, which comprises polymerizing a diol with a titanium-based esterification catalyst and then decreasing the activity of said titanium-based esterification catalyst, to produce a polymer diol, and then adding a tin compound to the obtained polymer diol.

The present invention yet further provides an elastic fiber comprising said thermoplastic polyurethane composition (III).

The present invention yet further provides a process for producing elastic fibers, which comprises melt spinning said thermoplastic polyurethane composition (III).

The present invention yet further provides a shaped article comprising said thermoplastic polyurethane composition (III).

The present invention yet further provides a process for producing shaped articles, which comprises melt molding said thermoplastic polyurethane composition (III) and heat treating the obtained molded products.

DESCRIPTION OF THE PREFERRED EMBODIMENTS

The thermoplastic polyurethane (I), which is a main component of the above thermoplastic polyurethane composition (III) consists essentially of a polymer diol component (A), an organic diisocyanate component (B) and a chain extender component (C).

The polymer diol component (A) used in the invention is desirably selected from ester-based polymer diols (esterbased polymers having hydroxyl groups on both ends of their main molecular chains), such as polyester diols, polyester-polycarbonate diols and polycarbonate diols. The polymer diol preferably has a number average molecular weight of 500 to 10,000.

The above polymer diols can be produced by polycondensing an dicarboxylic acid or its ester-forming derivatives such as esters or anhydrides thereof, and a short-chain diol by direct esterification or transesterification, or by subjecting a lactone to ring-opening polymerization.

Examples of usable dicarboxylic acids are saturated aliphatic dicarboxylic acids, e.g. succinic acid, adipic acid, pimelic acid, suberic acid, azelaic acid, sebacic acid and 1,10-decanedicarboxylic acid, and aromatic dicarboxylic acids, e.g. isophthalic acid and terephthalic acid. These dicarboxylic acids or ester-forming derivatives thereof (hereinafter these are sometimes referred to generically as "dicarboxylic acids" or, in a singular form, "a dicarboxylic acid) may be used singly or in combination of 2 or more.

Examples of short-chain diols usable for the above purpose are aliphatic diols, e.g. ethylene glycol, diethylene glycol, triethylene glycol, propylene glycol, 1,4-butanediol, neopentyl glycol, 1,5-pentanediol, 3-methyl-1,5-pentanediol, 1,6-hexanediol, 1,8-octanediol, 2-methyl-1,8-octanediol, 1,9-nonanediol and 1,10-decanedol; alicyclic diols, e.g. cyclohexanedimethanol and cyclohexanediol; and aromatic dihydric alcohols, e.g. metaxylylene glycol, paraxylylene glycol, bishydroxyethoxybenzene and bishydroxyethyl terephthalate. These short-chain diols may be used singly or in combination of 2 or more.

Examples of the above lactone are ε-caprolactone and β-methyl-δ-valerolactone.

The above polycarbonate diols can be produced for example by, in the usual manner, polycondensing by transesterification a short-chain diol and a carbonate such as a dialkyl carbonate, alkylene carbonate or diaryl carbonate. The same short-chain diols exemplified above as raw materials for polyester diols are also usable here. Examples of dialkyl carbonates are dimethyl carbonate and diethyl carbonate; a representative example of alkylene carbonates is ethylene carbonate and that of diaryl carbonates is diphenyl carbonate.

The above polyesterpolycarbonate diols can be produced for example by, in the usual manner, reacting (transesterification or transesterification and direct esterification) a short-chain diol, a dicarboxylic acid and a carbonate at the same time. The polyesterpolycarbonate diols can also be produced by separately synthesizing a polyester diol or a polycarbonate diol by the above processes and then reacting the obtained product with a carbonate or with a diol and a dicarboxylic acid.

In order to produce the effect of the present invention sufficiently, it is advantageous to maintain the concentration of ester groups (including carbonate groups) in the polymer diol component at a low level. For this purpose, the dicarboxylic acid used as a raw material for the polymer diol preferably has at least 6 carbon atoms, such as adipic acid or azelaic acid, and the short-chain diol is preferably has at least 4 carbon atoms, such as 3-methyl-1,5-pentanediol or 1,4-butanediol.

It is desirable, in the above esterification (ester-forming reaction, such as transesterification, direct esterification and ring-opening polymerization) for producing a polymer diol, to use a titanium-based esterification catalyst. Known titanium-based esterification catalysts used for producing ester-based polymers such as polyesters and polycarbonates are also usable for this purpose. In the present invention, the term "esterification" means "ester-forming reaction" which includes direct esterification of an alcohol and a carboxylic acid, transesterification of an alcohol and an ester-forming derivative of a carboxylic acid and ring-opening polymerization of a lactone.

Examples of preferred titanium-based esterification catalysts are titanic acid, tetraalkoxy titanium compounds, titanium acylate compounds and titanium chelate compounds. More concrete examples are tetraalkoxy titanium compounds, e.g. tetraisopropyl titanate, tetra-n-butyl titanate, tetra-2-ethylhexyl titanate and tetrastearyl titanate; titanium acylate compounds, e.g. polyhydroxytitanium stearate and polyisopropoxytitanium stearate and titanium chelate compounds, e.g. titanium acetylacetonate, triethanolamine titanate, titanium ammonium lactate, titanium ethyllactate and titanium octyleneglycolate.

These titanium-based esterification catalysts are used in an amount suitably selected according to the types of the intended polymer diol and the succeeding thermoplastic polyurethane, and the amount is not specifically limited. However, for producing polyester diols, the amount of the catalyst used is generally in a range of 0.1 to 50 ppm, preferably about 1 to 30 ppm, based on the amount of the raw materials (sum of the amounts of a dicarboxylic acid and a short-chain diol). If the amount of the catalyst is too small, it will take a significantly long time to produce the polymer diol and the obtained polymer diol will sometimes become colored. On the other hand, if the amount of the titanium-based esterification catalyst is too large, the excess catalyst will no longer contribute to acceleration of the formation of the polymer diol and, rather, it will become difficult, after synthesis of the polymer diol, to decrease the activity of the catalyst to a sufficiently low level.

In order to obtain a thermoplastic polyurethane suitable for the thermoplastic polyurethane composition (III) according to the present invention, it is important, where the polymer diol to be used therefor has been produced by esterification polymerization in the presence of a titanium-based esterification catalyst, to decrease sufficiently the activity of the catalyst present in the obtained polymer diol. To decrease the activity of the titanium-based esterification catalyst, it is recommended to subject the polymer diol containing the catalyst to a deactivation treatment of the catalyst, which is easy and simple. Complex processes are generally required for separating the titanium-based esterification catalyst from the catalyst-containing polymer diol, as well as for separating the resulting titanium compound from the polymer diol after being subjected to deactivation treatment of the titanium-based esterification catalyst. It is therefore recommended to subject the polymer diol containing the titanium-based esterification catalyst to a catalyst deactivation treatment without removing the titanium-based esterification catalyst, and to use the treated polymer diol, without removing the deactivated titanium compound, to use as it is or, as desired, after addition of a tin compound, for the production of the intended polyurethane. However, the above deactivation treatment does not necessarily exclude removal of the titanium-based esterification catalyst from the catalyst-containing polymer diol and/or removal of the deactivated titanium compound from the titanium compound-containing polymer diol having been subjected to deactivation treatment. Such being the case, the process employed in the present invention for producing a polymer diol, which comprises conducting polymerization with a titanium-based esterification catalyst and then deactivating the titanium-based esterification catalyst, may include purification steps, such as a step of removing the titanium-based esterification catalyst from the catalyst-containing polymer diol or, after an deactivation treatment, a step of removing the deactivated titanium compound from the polymer diol containing it.

The above deactivation treatment for the titanium-based esterification catalyst present in the catalyst-containing polymer diol may be conducted either to eliminate substantially completely the catalytic activity of the titanium-based esterification catalyst, or to decrease it to a desired level. It is desirable that the deactivation be conducted by contacting with water the polymer diol containing the titanium-based esterification catalyst with heating. The deactivation may also be effected by adding a phosphorus compound, such as phosphoric acid, a phosphoric acid ester, phosphorous acid or a phosphorous acid ester, to the polymer diol containing the titanium-based esterification catalyst. However, this latter process, is not advantageous, since the process, requiring an at least equimolar amount of a phosphorus compound, tends to decrease the resistance to hydrolysis of the treated polymer diol and thermoplastic polyurethanes obtained therefrom. The deactivation treatment of the titanium-based esterification catalyst may be conducted either directly after the esterification polymerization or after a desired period.

Upon deactivation of a titanium-based esterification catalyst with water, the amount of water added to the polymer containing the titanium-based esterification catalyst is appropriately selected according to the type, concentration and the like of the titanium-based esterification catalyst. It is generally recommended, in view of capability of decreasing the activity of the titanium-based esterification catalyst, that the amount be at least about 0.5% by weight based on the weight of the polymer diol, more preferably at least 1% by weight on the same basis. The upper limit of the amount of water is not specifically limited, and addition of even a large amount of water would not adversely affect the function of decreasing the activity of the titanium-based esterification catalyst. However, too large an amount of water makes complex removal of the water after deactivation. The amount of water is therefore preferably not more than 5% by weight based on the weight of the polymer diol.

It is desirable that the heating temperature employed upon contact with water be in a range of 70° to 150° C., more preferably in a range of 90° to 130° C. With the heating temperature being less than 70° C., the activity of the titanium-based esterification catalyst is decreased sometimes only insufficiently. On the other hand, at temperatures higher than 150° C. the polymer diol sometimes decomposes. Heating to above 100° C. may be conducted either under a pressure or by contacting water in the form of steam. The heating time is not specifically limited, but it is generally about 1 to 3 hours for the purpose of achieving a sufficient effect.

After completion of the deactivation of the titanium-based esterification catalyst with water, the water can be removed from the polymer diol by any optional process such as heating and drying under reduced pressure.

The organic diisocyanate component (B) in the present invention is derived from an organic diisocyanate. Representative examples of usable diisocyanates are those having a molecular weight of not more than 500, such as aromatic diisocyanates, e.g. 4,4'-diphenylmethane diisocyanate, phenylene diisocyanate, tolylene diisocyanate, 1,5-naphthalene diisocyanate and xylylene diisocyanate; and alycyclic diisocyanates, e.g. isophorone diisocyanate and 4,4'-dicyclohexyl diisocyanate. Among these diisocyanates, 4,4'-diphenylmethane diisocyanate is particularly preferred. The chain extender component (C) in the present invention is derived from a chain extender. Any low-molecular-weight compound having at least 2 hydrogen atoms capable of reacting with isocyanate group (—NCO) (hereinafter this hydrogen atom is sometimes referred to as "active hydrogen atom") can be used for this purpose. Examples of suitable chain extenders are diols having a molecular weight of not more than 400, e.g. 1,4-butanediol, 1,6-hexanediol, 1,9-nonanediol, 1,4-bis(2-hydroxyethoxy)benzene and p-xylylene glycol.

The thermoplastic polyurethane (I) is obtained by reacting the above polymer diol, organic diisocyanate and chain extender.

In the production of the thermoplastic polyurethane (I), it is recommended to use a polymer diol, an organic di-isocyanate and a chain extender in such amounts as to permit the molar ratio between the moles of isocyanate groups present in the organic diisocyanate (B') and the total moles of active hydrogen atoms present in the polymer diol (A') and the chain extender (C'), (B')/[(A')+(C')] to fall within a range of about 0.95 to about 1.3, preferably about 0.97 to about 1.1. If the molar ratio is too small, the molecular weight of the resulting polyurethane after molding will be recovered insufficiently, whereby the molded articles tend to become poor in heat resistance, compression set, strength and like properties. If the molar ratio is too large, the molecular weight of the polyurethane will decrease significantly during molding, so that the moldability tends to decrease and the hardness of the molded articles tends to change with elapse of time to a large extent.

In the present invention, it is desirable that the thermoplastic polyurethane (I) have an inherent viscosity as determined on its 0.5 g/dl solution dissolved in a 1% by weight n-butylamine solution in dimethylformamide at 30° C. of 0.5 to 2.0 dl/g, more preferably 0.7 to 2.0 dl/g, in view of the mechanical properties, heat resistance and the like of molded articles obtained therefrom.

The thermoplastic polyurethane composition (III) of the present invention consists essentially the above thermoplastic polyurethane (I) and a tin compound (II).

As the tin compound (II), those capable of exhibiting an urethanization catalytic activity can be used. Examples of tin compounds capable of exhibiting an urethanization catalytic activity are acylate compounds and mercaptocarboxylic acid salts, e.g. tin octylate, monomethyltin mercaptoacetate, monobutyltin triacetate, monobutyltin monooctylate, monobutyltin monoacetate, monobutyltin maleate, monobutyltin maleaic acid benzyl ester salts, monooctyltin maleate, monooctyltin thiodipropionate, monooctyltin tris(isooctyl thioglycolic acid esters), monophenyltin triacetate, dimethyltin maleic acid ester salts, dimethyltin his(ethylene glycol monothioglycolate), dimethyltin bis(mercaptoacetic acid) salt, dimethyltin bis(3-mercaptopropionate), dimethyltin bis (isooctyl mercaptoacetate), dibutyltin diacetate, dibutyltin dioctoate, dibutyltin distearate, dibutyltin dilaurate, dibutyltin maleate, dibutyltin maleate polymer, dibutyltin maleic acid ester salts, dibutyltin bis(mercaptoacetic acid), dibutyltin (mercaptoacetic acid alkyl ester) salts, dibutyltin (3-mercaptopropionic acid alkoxybutyl ester) salts, dibutyltin bisoctyl thioglycol ester salts, dibutyltin (3-mercaptopropionic acid) salt, dioctyltin maleate, dioctyltin maleic acid ester salts, dioctyltin maleate polymer, dioctyltin dilaurate, dioctyltin bis(isooctyl mercaptoacetate), dioctyltin bis(isooctylthioglycolic acid esters) and dioctyltin bis (3-mercaptopropionate). Preferred among the above tin compouns are dialkyltin diacylates, e.g. dibutyltin diacetate and dibutyltin dilaurate, and dialkyltin bismercaptocarboxylic acid ester salts, e.g. dibutyltin (3-mercaptopropionic acid ethoxybutyl ester) salt.

The tin compound (II) is, as described later herein, sometimes used, after being added to a polymer diol, for urethanization reaction of the polymer diol, an organic diisocyanate and a chain extender to obtain the thermoplastic polyurethane composition (III). In this case, the tin compound (II) used is preferably soluble in the polymer diol. The above exemplified tin compounds are preferable also in this respect.

The content of a tin compound (II) in the thermoplastic polyurethane composition (III) of the present invention is 0.3 to 15 ppm as converted into tin atom based on the amount of the thermoplastic polyurethane (I).

If the content of the tin compound (II) is less than 0.3 ppm as converted into tin atom, the resulting thermoplastic polyurethane composition will, when melt molded, give molded articles which readily stick together and have markedly poor physical properties, since the molecular weight of the polyurethane having decreased upon the molding is hardly recoverable. In addition, upon melt polymerization of a polymer diol with which the activity of the titanium-based esterification catalyst has been decreased, an organic diisocyanate and a chain extender in the presence of a tin compound (II) to produce a thermoplastic polyurethane composition, if the content of the tin compound in the resulting thermoplastic polyurethane is less than 0.3 ppm of tin atom, pellets of the obtained thermoplastic polyurethane composition will tend to stick together, since the polyurethane can hardly have a high molecular weight due to a low rate of re-increasing the molecular weight during the polymerization.

If the content of the tin compound (II) exceeds 15 ppm as converted into tin atom based on the thermoplastic polyurethane, the thermoplastic polyurethane will tend to have poor heat resistance, resistance to hydrolysis and like properties. That is, a thermoplastic polyurethane having a tin compound content exceeding 15 ppm gives, upon melt molding, in particular extrusion molding, molded articles being inferior in heat resistance, compression set, tensile strength and elongation and like properties, since the content of long-chain hard segments in the polyurethane molecules decreases to a markedly low level.

From the viewpoint of obtaining melt molded products having particularly good heat resistance, compression set and tensile strength and elongation and the like, the content of the tin compound is preferably in a range of 0.5 to 12 ppm as converted into tin atom based on the thermoplastic polyurethane (I).

The level of remaining activity of a titanium-based esterification catalyst present in a polymer diol and that of activation of urethanization by addition of a tin compound can be evaluated by, for example, determining the apparent rate constant (k) of reaction of the polymer diol with 4,4'-diphenylmethane diisocyanate (MDI) at 90° C.

The thermoplastic polyurethane composition (III) of the present invention has, when melt treated at 220° C. for 60 minutes, a retention ratio of long-chain hard segments (hard segments having at least 3 repeating units consisting of one unit from the organic diisocyanate and one unit from the chain extender) of at least 85% in the thermoplastic polyurethane (I).

Among a polymer diol component (A), an organic diisocyanate component (8) and a chain extender component (C), components (B) and (C) generally constitute the hard segments present in molecules of the thermoplastic polyurethane (I). A hard segment comprises at least one repeating unit formed by addition of one unit from (B) and one unit from (C) or comprises one unit from (B). The above "long-chain hard segment" means hard segments containing at least 3 units of the above repeating unit. The retention ratio of long-chain hard segments in the thermoplastic polyurethane composition (III) is herein obtained by determining the content (% by weight) of long-chain hard segments based on total hard segments present in the thermoplastic polyurethane of the thermoplastic polyurethane composition (III) and that after having melt treated the thermoplastic polyurethane composition (III) at 220° C. for 60 minutes, and calculating the ratio of the latter to the former. The hard segments in a thermoplastic polyurethane can be determined as follows. A thermoplastic polyurethane composition sample is subjected to a reaction that cuts the ester bonds in the polyurethane molecules, thereby converting the hard segments into urethane diol compounds with the main part of their molecular chains consisting of at least one repeating unit containing units from component (8) and component (C) or consisting of at least one unit from component (B), to each of the ends of the molecular chains a short-chain diol that has constituted the ends of component (A) bonds by urethanization. The reaction for cutting the ester bonds in the polyurethane molecules is effected by swelling the thermoplastic polyurethane composition sample by contacting it with a small amount of tetrahydrofuran, then placing the swollen sample in a 0.01N solution of potassium hydroxide in methanol and stirring the mixture at 50° C. for 5 days. Accordingly, in the determination of the long-chain hard segment content in the thermoplastic polyurethane composition (III), fragments comprising an organic diisocyanate component and a short-chain diol component and fragments comprising an organic diisocyanate component, a chain extender component and a short-chain diol component are deemed as hard segments.

Figure 1:
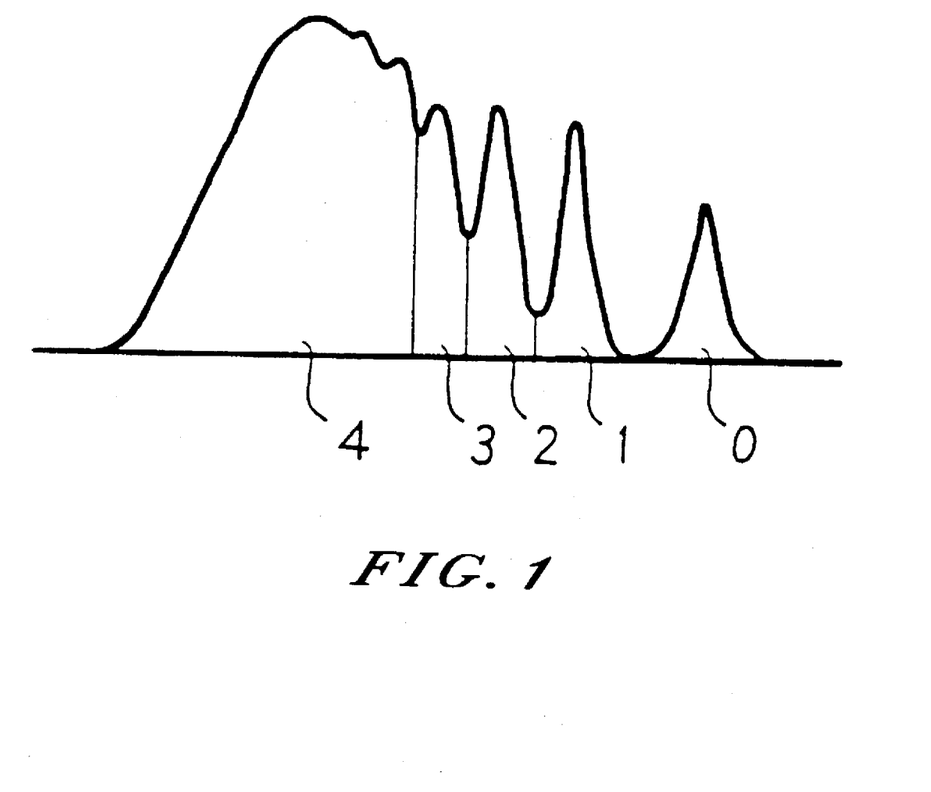
FIG. 1 is a GPC chart showing the chain length distribution of hard segment of a polyurethane in one embodiment of the thermoplastic polyurethane composition according to the present invention.

FIG. 1 is a GPC chart showing the chain length distribution of hard segment of a polyurethane in one embodiment of the thermoplastic polyurethane composition (III) according to the present invention (as obtained in Example 4 to be described later). In this example, hard segments of the polyurethane comprise either: 4,4'diphenylmethane diisocyanate component corresponding to an organic diisocyanate component, 1,4-butanediol component corresponding to a chain extender component and 3-methyl-1,5-pentanediol component corresponding to s short-chain diol having constituted the molecular ends of a polymer diol component, or the 4,4-diphenylmethane diisocyanate component and the 3-methyl-1,5-pentanediol component. In FIG. 1, numerals put on the peaks represent the number of repeating units consisting of a 4,4'-diphenylmethane diisocyanate unit and a 1,4-butanediol unit, in the hard segments occupying the peaks. However, in this example, all cases with a repetition number of at least 4 are temporarily expressed as 4, because, with the repetition number being at least 4, peaks were not separated clearly. Thus, the hard segments shown by an integer of 0 to 4 in FIG. 1 have the following structures.

0: MPD-MDI-MPD

1: MPD-(MDI-BD)$_1$-MDI-MPD

2: MPD-(MDI-BD)$_2$-MDI-MPD

3: MPD-(MDI-BD)$_3$-MDI-MPD

4: MPD-(MDI-BD)$_n$-MDI-MPD (n≧4)

wherein MPD represents a unit from 3-methyl-1,5-pentane diol (—O—(CH$_2$)$_2$—CH(CH$_3$)—(CH$_2$)$_2$—OH), MDI a unit from 4,4'-diphenylmethane diisocyanate (—C(=O)—NH—C$_6$H$_4$—CH$_2$—C$_6$H$_4$—NH—C(=O)—) and BD a unit from 1,4-butanediol (—O—(CH$_2$)$_4$—O—).

The melt treatment of a sample of the thermoplastic polyurethane composition (III) upon determination of the retention ratio when heat melted of long-chain hard segments can be conducted by, for example, after dewatering and drying the sample, kneading it in a melted state in a laboratory plasto mill at 220° C. for 60 minutes.

The long-chain hard segment content and the retention ratio of long-chain hard segments after being heat melted depend on the level of decrease in the activity of the titanium-based esterification catalyst present in the polymer diol used for producing the thermoplastic polyurethane. With the remaining titanium-based esterification catalyst having a high activity, the apparent rate constant (k) of reaction of the polymer diol with 4,4'-diphenylmethane diisocyanate becomes high, which accelerates the urethanization reaction, but the thermoplastic polyurethane obtained by melt polymerization tends to have a low content of long-chain hard segments and has a retention ratio of long-chain hard segments when heat melted of less than 85%. Thermoplastic polyurethanes with a high activity of remaining titanium-based esterification catalyst have poor moldability and can only give, upon melt molding, molded articles having poor properties, such as tensile strength and elongation, compression set, heat resistance and resistance to hydrolysis. It is therefore very important, for the purpose of maintaining at least 85% the retention ratio when heat melted of long-chain hard segments in a thermoplastic polyurethane, that the activity of the titanium-based esterification catalyst be sufficiently low.

The thermoplastic polyurethane composition (III) of the present invention has a retention ratio of inherent viscosity, after the composition has been melt treated at 220° C. for 6 minutes and then melt extruded and, thereafter, allowed to stand at 20° C., 60% RH (relative humidity) for 24 hours, of at least 85%.

Where, as described above, the activity of the titanium-based catalyst in a thermoplastic polyurethane is sufficiently low, it becomes possible to maintain the retention ratio when heat melted of long-chain hard segments at at least 85%. However, in order to maintain the retention ratio of inherent viscosity after melt extrusion at at least 85%, it is important that the thermoplastic polyurethane composition contain a tin compound in an appropriate amount within the range of 0.5 to 15 ppm.

The presence of a tin compound, having a high urethanization catalytic activity, increases the apparent rate constant (k) of reaction of a polymer diol with the titanium-based catalyst having been decreased to a sufficiently low level and 4,4'-diphenylmethane diisocyanate (MDI). With a thermoplastic polyurethane composition obtained by melt polymerization using a polymer diol containing a titanium-based esterification catalyst whose activity has been decreased sufficiently and in the presence of an appropriate amount of a tin compound, it becomes possible not only to obtain a high hard segment content and a retention ratio when heat melted of long-chain hard segments of at least 85%, but to achieve a retention ratio of inherent viscosity after melt extrusion of at least 85%. The thus obtained thermoplastic polyurethane composition, having a retention ratio when heat melted of long-chain hard segments of at least 85% and a retention ratio of inherent viscosity after melt extrusion of at least 85%, has excellent moldability and can give molded articles having excellent tensile strength and elongation, compression set, heat resistance, resistance to hydrolysis and like properties.

Known esterification catalysts for the production of a polymer diol include, besides titanium-based catalysts, tin-based ones, too. However, the use of a tin-based esterification catalyst, having lower esterification catalytic activity compared to titanium-based esterification catalysts, in a low concentration as is used with titanium-based catalysts, is not practical, since it requires a long time to permit the obtained polymer diol to achieve a molecular weight of a desired level. The use of a tin-based esterification catalyst in a high concentration, which can shorten the production time for the desired polymer diol, is not preferred, since the thermoplastic polyurethane obtained from the resulting polymer diol will tend to have a low retention ratio when heat melted of long-chain hard segments.

It is desirable, from the viewpoint of shortening the urethanization polymerization time, that the thermoplastic polyurethane composition (III) of the present invention be produced by the successive steps of obtaining a polymer diol by polymerization in the presence of a titanium-based esterification catalyst, decreasing the activity of the titanium-based catalyst contained in the polymer diol and polymerizing the polymer diol, an organic diisocyanate and a chain extender in the presence of a tin compound (II) in a prescribed concentration. That is, although it is possible to add a tin compound (II) after preparation of a thermoplastic polyurethane (I), it is more preferred to add it before completion of the polymerization of a polymer diol, an organic diisocyanate and a chain extender. This is because, in this manner, the thermoplastic polyurethane (I) can be produced uniformly and in a high productivity. It is therefore recommended to add a tin compound (II) during the production of a polymer diol, during the period after the production of the polymer diol and before starting the polymerization of a thermoplastic polyurethane, or during the polymerization for the thermoplastic polyurethane. Among the above, it is particularly beneficial in practice to add a tin compound (II) to a polymer diol, thereby using the tin compound (II) for the urethanization polymerization of the polymer diol, an organic diisocyanate and a chain extender. The tin compound can be added to a polymer diol while the polymer diol is, as required with heating, being stirred.

Known urethanization techniques can be used for the polymerization of a polymer diol, an organic diisocyanate and a chain extender, to obtain thermoplastic polyurethanes usable in the present invention. According to a study made by the present inventors, melt polymerization, in particular one in the presence of substantially no solvent is preferred, and continuous melt polymerization with a multi-screw extruder is more particularly preferred. Thermoplastic polyurethanes obtained by continuous melt polymerization have better uniformity and strength and, when molded into a film, cause fish eyes to form in a smaller number, compared to those obtained by, for example, bulk polymerization at a temperature of 80° to 130° C. The melt polymerization temperature is not specifically limited, but in general it is preferably in a range of 180° to 260° C. At temperatures not more than 260° C., the obtained thermoplastic polyurethanes can possess increased heat resistance and moldability. At temperatures above 180° C., the obtained thermoplastic polyurethanes can be provided with good moldability and give molded products having good properties.

During or after completion of polymerization for the thermoplastic polyurethane, additives may be appropriately added thereto, such as a color, lubricant, crystallization nucleus agent, flame retardant, UV absorber, antioxidant, stabilizer against hydrolysis and mildew-resistant agent.

While the effect of the present invention is produced by thermoplastic polyurethanes having various hardnesses, it is most markedly produced by those having a low JIS-A hardness of not more than 75. This is considered to be due to the fact that: while a polymer diol having a relatively high molecular weight is suitably used for producing a low-hardness polyurethane, the tin compound present in the system markedly increases the urethanization reactivity which would otherwise be decreased resulting, presumably, from a low compatibility between the high-molecular-weight polymer diol and the organic diisocyanate used. From this viewpoint, the effect of the present invention, which is to provide thermoplastic polyurethane compositions having excellent moldability and being capable of giving molded products having excellent properties such as tensile strength and elongation, compression set, heat resistance and resistance to hydrolysis, is produced particularly markedly in the following representative embodiments. That is, the most desirable thermoplastic polyurethanes (I) are obtained by polymerizing:

a polymer diol (A') having a number average molecular weight of 3,000 to 8,000 and containing diol units represented by the following general Formula (1)

$$-O-(CH_2)_m-CH(CH_3)-(CH_2)_n-O- \quad (1)$$

wherein m and n each represents an integer of 1 or more with the sum of m and n being in a range of 4 to 9, in an amount of at least 30 mole % of total diol units, an organic diisocyanate (B') and a chain extender (C'), in such amounts as to make the molar ratio of (B')/(A') 2.8 to 8.0.

The thermoplastic polyurethane compositions (III) of the present invention can be subjected to melt molding, such as injection molding or extrusion molding, and the obtained molded articles can show excellent performances stably upon heat treatment after the melt molding. The heat treatment is preferably conducted by heating at a temperature of 50° to 110° C. for 1 to 24 hours.

When the thermoplastic polyurethane compositions (III) of the present invention are melt molded by injection molding, extrusion molding or like processes, the molecular weight after the melt molding rapidly recovers (increases), whereby the decrease in the properties, as well as, sticking of molded articles is suppressed. The thermoplastic polyurethane compositions (III) therefore have excellent moldability and give molded products being excellent in tensile strength and elongation, compression set, heat resistance, resistance to hydrolysis and like properties. Thanks to these features, the thermoplastic polyurethane compositions (III) are applicable to a wide variety of end-uses, such as sheets, films, rolls, gears, solid tires, belts, hoses, tubes, packings, air bags, wrist straps, shock-proof materials, shoe soles, sports shoes, machine parts, automobile parts, sporting goods and artificial leathers.

Furthermore, the thermoplastic polyurethane compositions (III) of the present invention produce an excellent effect when used for producing elastic polyurethane fibers by melt spinning.

Elastic polyurethane fibers obtained by melt spinning have excellent heat settability, abrasion resistance, resistance to chlorine, transparency and like properties and are of low production costs, and have hence attracted much attention and been produced in increasing amounts. However, with a conventional thermoplastic polyurethane, the molecular weight decreases just after the polyurethane has been melt extruded, because of thermal dissociation of isocyanate groups and hydroxyl groups. After being extruded through spinning nozzles, urethane bonds will re-form and the molecular weight of the polyurethane will recover (increase) as cooling proceeds, thereby rendering it possible to take up extruded filaments. However, if the molecular weight increases on this occasion too slowly, the extruded filaments tend to break and, after being taken up, the filaments tend to stick together and cause poor unwinding capability.

The thermoplastic polyurethane compositions (III) of the present invention, having a high urethanization reactivity, give elastic fibers having excellent processability during warping, knitting, dyeing or like processes, while suppressing filament breakages and sticking during spinning, without deteriorating the excellent hot water resistance, resistance to hydrolysis and like properties inherent to thermoplastic polyurethane. The thermoplastic polyurethane compositions (III) of the present invention can also be subjected to high-speed spinning.

Other features of the invention will become more apparent in the course of the following descriptions of exemplary embodiments which are given for illustration of the invention and are not intended to be limiting thereof.

In the Examples and Comparative Examples that follow, the following methods were used to determine, for thermoplastic polyurethane samples, the reactivity of polymer diol with isocyanate groups, inherent viscosity, content of long-chain hard segments (long-chain HS content) and its retention ratio when heat melted, retention ratio of inherent viscosity, tensile strength and elongation, hardness, moldability (deformation upon molding), compression set, Vicat softening point (heat resistance), cold resistance and resistance to hydrolysis; and, for elastic fibers, the tensile strength and elongation, elastic recovery ratio, hot water resistance, resistance to hydrolysis and filament breakage rate.

Reactivity of polymer diol with isocyanate groups

A reaction vessel is charged with a polymer diol sample and 4,4'-diphenylmethane diisocyanate in a molar ratio of 3:1. The mixture is continuously stirred at a temperature of 90° C. and part of the reaction mixture is taken out at regular intervals. The reaction mixtures are each dissolved in a specified amount of a 0.01N di-n-butylamine solution in N,N-dimethylformamide. The obtained solutions are subjected to neutralization titration with 0.01N hydrochloric acid solution in methanol and with Bromphenol Blue as an indicator, and the residual amount of isocyanate groups (-NCO) at each reaction period is determined. From the residual amounts thus obtained, the corresponding concentrations of urethane groups (-NHCOO-) at the reaction periods are calculated.

The rate of urethanization reaction, which is proportional to the first order of each of the concentrations of hydroxyl groups and isocyanate groups. The rate constant (k) of second-order reaction is calculated by the following formula from the urethane group concentrations obtained above:

$kt=[1/(a-b)] \cdot \ln[b(a-x)/[a(b-x)]]$ where k=reaction rate constant, liter/mole·min t=reaction time (time elapsed before being taken out), min a=initial hydroxyl group (OH) concentration, mole/l b=initial isocyanate group (-NCO) concentration, mole/l x=urethane group (-NHCOO-) concentration at time t, mole/l Inherent viscosity A polyurethane sample in the form of pellets (melt extruded strands are cut and then dried at 80° C. for 4 hours), injection molded articles (having been allowed to stand at 80° C. for 4 hours after being injection molded) or elastic polyurethane fibers is dissolved in a concentration of 0.5 g/dl in a 1% by weight n-butylamine solution in N,N-dimethylformamide. The solution is allowed to stand at 20° C. for 24 hours and then measured with an Ubbelohde viscometer for falling time at 30° C. The inherent viscosity at 30° C. is calculated by:

Inherent viscosity=$[\ln(t/t_o)]/c$ where t=falling seconds of sample solution $t_o$=falling seconds of a 1% by weight solution of n-butylamine in N,N-dimethylformamide c=concentration of sample (about 0.5 g/dl)

Long-chain hard segment content (long-chain HS content)

A 2-g sample taken from polyurethane or from molded article therefrom is swollen by addition of 5 ml of tetrahydrofuran (THF). After 2 hours, 25 ml of a 0.01N potassium hydroxide solution is added and the mixture is stirred at 50° C. for 5 days, to decompose (cut the ester bonds of) the polyurethane. After the decomposition, the solvent is removed by evaporation at 50° C. within 2 hours. The residue is placed in 1000 ml of water and the mixture is filtered through a filter paper, to give compounds resulting from hard segments. The compounds are sufficiently dried and 0.020 g is weighed therefrom. The weighed specimen is dissolved in a mixture of 2.0 ml of N-methylpyrrolidone (NMP) and 6.0 ml of THF, and the obtained solution is subjected to GPC (gel permeation chromatography) with the following apparatuses and under the following conditions:

High performance liquid chromatograph LC-9A (Shimadzu Corp.)

Column oven CTO-6A (40° C.) (Shimadzu Corp.)

Differential diffraction meter detector for high performance liquid chromatograph RID-6A (Shimadzu Corp.)

Chromato pack C-R4A (Shimadzu Corp.)

Columns: Shodex GPC KF-802 (Showa Denko K.K.)

Columns: Shodex GPC KF-802.5 (Showa Denko K.K.)

A 20-µ 1 sample is injected and the solvent (THF) is flown at a rate of 1.0 ml/min. In the analysis after measurement, the area between the elution curve and the base line is obtained. Only incompletely separable peaks are treated by vertical division method as shown in FIG. 1. Although those polyurethanes that have used a mixture of at least 2 compounds as chain extenders or as organic diisocyanates may sometimes cause shoulder part to form at each peak, this will not cause problems in the separation of peaks. Compounds originating from hard segments having at least 3 repeating units consisting of units from an organic diisocyanate and a chain extender are defined as long-chain hard segments. The GPC a real fraction of the long-chain hard segment based on total hard segments is taken as the long-chain hard segment content (% by weight).

Retention ratio when heat melted of long-chain hard segment content

A 60-g polyurethane sample is dewatered under vacuum at 90° C. for 3 hours and then kneaded in a melting state with a laboratory plasto mill (made by Toyo Seiki Co.) at 220° C. for 60 minutes under an atmosphere of nitrogen. The long-chain hard segment content is determined in the above manner for samples both before and after kneading. The retention ratio when heat melted is defined as the ratio of the long-chain hard segment content after kneading to that before kneading.

Retention ratio of inherent viscosity

A 2-g polyurethane sample is dewatered under vacuum at 90° C. for 3 hours and then melted and kept in a flow tester (CFT-500, made by Shimadzu Corp.) at 220° C. for 6 minutes and melt extruded. The extrudates are allowed to stand at 20° C., 60% RH for 24 hours. The sample before being melted (after vacuum-dewatering) and the extrudates after being kept at 20° C. are each tested for inherent viscosity. The retention ratio of inherent viscosity is defined as the ratio of the inherent viscosity of the extrudates to that of the polyurethane before melting.

Tensile strength and elongation

JIS K-7311 is applied. That is, a 2-mm thick polyurethane sample sheet is obtained by injection molding and dumbbell test specimens are prepared therefrom. The specimens are tested for tensile strength and elongation at break at an extension rate of 30 cm/min.

Tensile strength and elongation of elastic polyurethane fiber

JIS L-1013 is applied.

Hardness

Six plies of a 2-mm thick polyurethane sample sheet are laid on each other and measured for the hardness with a Shore A hardness tester.

Moldability (deformation when molded)

A polyurethane sample is injection molded with a die having a diameter of 120 mm into 2-mm thick discs. The discs are measured for the diameter in the direction of injection. The deformation when molded is defined as the ratio of the length shrunk to the size of the mold, as follows:

Deformation when molded (%)=$[(L_1-L_2)/L_1] \times 100$ where $L_1$=size of mold (120 mm)

$L_2$=diameter of molded disc in the direction of injection, mm

Compression set

An injection-molded sample is treated at 80° C. for 4 hours and then subjected to a compression test, according to JIS K-7311, under the conditions of a compression ratio of 25%, a heat treatment temperature of 70° C. and a compression time of 22 hours.

Vicar softening point (heat resistance)

An injection molded sample is treated at 80° C. for 4 hours and then tested, according to JIS K-7206, under a pressure of 1 kgf.

Cold resistance

Specimens prepared from a 2-mm thick polyurethane sheet are tested for dynamic viscoelasticity at a frequency of 11 Hz. The temperature (Tα) at which the dynamic elasticity loss (E") reaches the maximum is taken as an index of cold resistance.

Resistance to hydrolysis

Dumbbell specimens prepared from a 2-mm thick polyurethane sheet sample are allowed to stand at 70° C., 95% RH for 21 days. The specimens are tested for tensile strength before and after this exposure. The retention ratio between the strength after the exposure and that before the exposure is taken as an index of resistance to hydrolysis.

Elastic recovery ratio of elastic polyurethane fiber

A filament sample is elongated by 300% and held as elongated for 10 minutes. The sample is then released from tension and allowed to stand for 2 minutes. The elastic recovery ratio (%) is calculated by:

Elastic recovery ratio=$[1-(L-L_0)/L_0] \times 100$ where L=length of specimen after being allowed to stand for 2 minutes after release of tension $L_0$=length of specimen before elongation Hot water resistance of elastic polyurethane fiber A filament sample is elongated by 200% and fixed on a wooden frame or the like. The sample is treated with hot water of 130° C. under pressure for 30 minutes and measured for the stress while being elongated by 200% [the stress is expressed as R (g/80 dr)]. The sample is released from tension and immediately thereafter measured for the length. The residual strain [S (%)] is calculated by:

$S=[(L-L_0)/(2L_0)] \times 100$ where L=length of sample after hot water treatment $L_0$=length of sample before hot water treatment The residual strain S is an index showing the elongation of the sample after hot water treatment. The hot water resistance increases with decreasing S.

Resistance to hydrolysis of elastic polyurethane fiber

A polyurethane filament sample having a fineness of 40 deniers is allowed to stand in a free condition at 70° C., 95% RH for 35 days. The tensile strength of the sample is measured before and after the above treatment. The retention ratio between the strength after the treatment and that before the treatment is taken as an index of resistance to hydrolysis.

Filament breakage rate

The filament breakages during spinning is evaluated in terms of the following standards.

Number of filament breakages

○: not more than 0.01 time/kg-polyurethane

Δ: 0.01 to 0.05 time/kg-polyurethane

×: at least 0.05 time/kg-polyurethane

In the Examples and Comparative Examples, the compounds used are sometimes shown by abbreviations, as in Table 1.

TABLE 1

| Abbrev. | Compound |
|---------|----------|
| PMPA | Polyester diol obtained from 3-methyl-1,5-pentane-diol and adipic acid |
| PBA | Polyester diol obtained from 1,4-butanediol and adipic acid |
| PMAZ | Polyester diol obtained from 3-methyl-1,5-pentane-diol and azelaic acid |
| MDI | 4,4'-Diphenylmethane diisocyanate |
| BD | 1,4-Butanediol |
| DBA | Dibutyltin diacetate |
| DBL | Dibutyltin dilaurate |

REFERENCE EXAMPLE 1 (preparation of polyester diol)

A reaction vessel was charged with 3,000 g of 3-methyl-1,5-pentanediol and 2,920 g of adipic acid, and esterification was effected at 200° C. under atmospheric pressure while the water that formed was being distilled off from the reaction zone. When the acid value of the reaction mixture decreased down below 30, 90mg of tetraisopropyl titanate was added and reaction was allowed to proceed further, under a reduced pressure of 200 to 100 mmHg. When the acid value reached 1.0, the degree of vacuum was gradually increased by a vacuum pump, to complete the reaction. As a result, 4,820 g of a PMPA having an acid value of 0.1 and a number average molecular weight of 2,000 was obtained (hereinafter this PMPA is referred to as "PMPA-A").

The reaction rate constant of the PMPA was determined by the above method, and found to be 0.5 l/mole·min.

REFERENCE EXAMPLE 2 (Deactivation of titanium-based esterification catalyst with water)

One thousand (1,000) grams of the PMPA-A obtained in Reference Example 1 was heated to 100° C. After addition of 20 g (2% by weight) of water, heating was continued with stirring for 2 hours, to deactivate the titanium-based esterification catalyst, and then the water was distilled off under reduced pressure. The thus obtained PMPA (hereinafter referred to as "PMPA-B") had a reaction rate constant of 0.08 l/mole·min.

REFERENCE EXAMPLE 3 (Preparation of polyester diol)

A reaction vessel was charged with 2,200 g of 1,4-butanediol and 2,920 g of adipic acid and esterification was effected in the same manner as in Reference Example 1, to obtain 4,180 g of a PBA having an acid value of 0.15 and a number average molecular weight of 2,000 (hereinafter referred to as "PBA-A").

The PBA-A was subjected to deactivation treatment of the titanium-based catalyst in the same manner as in Reference Example 2, and the water was distilled off under reduced pressure. The PBA thus obtained (hereinafter referred to as "PBA-B") had a reaction rate constant of 0.1 l/mole-min.

REFERENCE EXAMPLE 4 (Preparation of polyester diol)

A reaction vessel was charged with 2,700 g of 3-methyl-1,5-pentanediol and 2,920 g of adipic acid, and esterification was effected in the same manner as in Reference Example 1, to obtain 4,670 g of a PMPA having an acid value of 0.1 and a number average molecular weight of 5,000 was obtained (hereinafter this PMPA is referred to as "PMPA-C").

The PMPA had a reaction rate constant of 0.3 l/mole-min.

REFERENCE EXAMPLE 5 (Deactivation of titanium-based esterification catalyst with water)

Reference Example 2 was repeated except that PMPC-C obtained in Reference Example 4 was used, to deactivate the titanium-based esterification catalyst, and then the water was distilled off under reduced pressure. The thus obtained PMPA (hereinafter referred to as "PMPA-D") had a reaction rate constant of 0.05 l/mole.min.

EXAMPLE 1

A PMPA composition was obtained by adding 3 ppm (1 ppm as converted into tin atom) of dibutyltin diacetate to the PMPA (PMPA-B) obtained in Reference Exmaple 2. The obtained PMPA composition (hereinafter referred to as "PMPA composition E") had a reaction rate constant of 0.5 l/mole.min.

Continuous melt polymerization was conducted at a temperature of 240° to 250° C. by feeding through metering pumps to a 30-φ same-direction twin-screw extruder with an L/D of 36, the PMPA composition E heated at 80° C., 1,4-butanediol (BD) heated at 80° C. and MDI heat melted at 50° C., in such amounts as to make the molar ratio ·(PMPA:BD:MDI) 1:3:4.01 and in a total rate of 300 g/min. The obtained melts of a thermoplastic polyurethane were extruded into water to form a strand, which was then cut with a pelletizer into pellets.

The pellets thus obtained were dried at 80° C. for 20 hours and then tested for inherent viscosity, long-chain hard segment content and its retention ratio when heat melted and retention ratio of inherent viscosity. The pellets were also injection molded into a 2-mm thick polyurethane sheet. The sheet was allowed to stand at 80° C. for 8 hours and then tested for inherent viscosity. Separately, dumbbell specimens were prepared from the sheet and tested for tensile strength and elongation, hardness, deformation when molded, compression set, Vicat softening point, cold resistance and resistance to hydrolysis.

The results obtained are shown in Tables 2 through 4.

EXAMPLE 2

A PMPA composition was obtained by adding 10 ppm (1.9 ppm as converted into tin atom) of dibutyltin dilaurate to the PMPA (PMPA-B) obtained in Reference Example 2. The obtained PMPA composition (hereinafter referred to as "PMPA composition F") had a reaction rate constant of 0.9 l/mole-min.

Example 1 was repeated except that the PMPA composition F was used, to conduct continuous melt polymerization, pelletization and drying, to obtain pellets of a theremoplastic polyurethane. Various evaluations were made on the pellets and molded articles therefrom, in the same manner.

The results obtained are shown in Tables 2 through 4.

EXAMPLE 3

A PBA composition was obtained by adding 5 ppm (1.7 ppm as converted into tin atom) of dibutyltin diacetate to the PBA (PBA-B) obtained in Reference Example 3. The obtained PBA composition (hereinafter referred to as "PBA composition C") had a reaction rate constant of 0.8 l/mole·min.

Example 1 was repeated except that the PBA composition C, BD and MDI were continuously fed through metering pumps in such amounts as to make the molar ratio thereof 1:3.2:4.2 and in a total rate of 300 g/min, to conduct continuous melt polymerization, pelletization and drying, to obtain pellets of a thermoplastic polyurethane. Various evaluations were made on the pellets and molded articles therefrom, in the same manner.

The results obtained are shown in Tables 2 through 4.

EXAMPLE 4

A PMPA composition was obtained by adding 15 ppm (5.1 ppm as converted into tin atom) of dibutyltin diacetate to the PMPA (PMPA-D) obtained in Reference Example 5. The obtained PMPA composition (hereinafter referred to as "PMPA composition G") had a reaction rate constant of 0.8 l/mole·min.

Example 1 was repeated except that the PMPA composition G, BD and MDI were continuously fed through metering pumps in such amounts as to make the molar ratio thereof 1:3.7:4.72 and in a total rate of 270 g/min, to conduct continuous melt polymerization, pelletization and drying, to obtain pellets of a thermoplastic polyurethane. Various evaluations were made on the pellets and molded articles therefrom, in the same manner.

The results obtained are shown in Tables 2 through 4.

EXAMPLE 5

A PMPA composition was obtained by adding 25 ppm (4.7 ppm as converted into tin atom) of dibutyltin dilaurate to the PMPA (PMPA-D) obtained in Reference Example 5. The obtained PMPA composition (hereinafter referred to as "PMPA composition H") had a reaction rate constant of 1.0 l/mole.min.

Example 1 was repeated except that the PMPA composition H, BD and MDI were continuously fed through metering pumps in such amounts as to make the molar ratio thereof 1:2.8:3.8 and in a total rate of 270 g/min, to conduct continuous melt polymerization, pelletization and drying, to obtain pellets of a thermoplastic polyurethane. Various evaluations were made on the pellets and molded articles therefrom, in the same manner.

The results obtained are shown in Tables 2 through 4.

EXAMPLE 6

A PMPA composition was obtained by adding 40 ppm (13.5 ppm as converted into tin atom) of dibutyltin diacetate to the PMPA (PMPA-D) obtained in Reference Example 5. The obtained PMPA composition (hereinafter referred to as "PMPA composition I") had a reaction rate constant of 3.0 l/mole·min.

Example 1 was repeated except that the PMPA composition I, BD and MDI were continuously fed through metering pumps in such amounts as to make the molar ratio thereof 1:2.5:3.52 and in a total rate of 270 g/min, to conduct continuous melt polymerization, pelletization and drying, to obtain pellets of a thermoplastic polyurethane. Various evaluations were made on the pellets and molded articles therefrom, in the same manner.

The results obtained are shown in Tables 2 through 4.

COMPARATIVE EXAMPLE 1

Example 1 was repeated except that the PMPA of which the titanium-based esterification catalyst had not been deactivated (PMPA-A) was used as it was (without addition of a tin compound), to conduct continuous melt polymerization, pelletization and drying, to obtain pellets of a thermoplastic polyurethane. Various evaluations were made on the pellets and molded articles therefrom, in the same manner.

The results obtained are shown in Tables 3 and 4.

COMPARATIVE EXAMPLE 2

An attempt was made, following the procedure of Example 1 except for using the PMPA (PMPA-B) obtained in Reference Example 2 as it was (without addition of a tin compound), to conduct continuous melt polymerization, i.e. to feed PMPA, BD and MDI continuously through metering pumps in such amounts as to make the molar ratio thereof 1:3:4.01 and in a total rate of 300 g/min. However, the extruded strand had poor threadability, to become slackened and form uneven thickness. Furthermore, upon cutting of the strand, it wrapped around the rotary blade frequently, thereby generating an extremely large amount of "mis-cuts", and stable pelletization was thus impossible.

The feed rate of the raw materials was then decreased to 200 g/min, whereby the pelletization became possible. The pellets were dried in the same manner. Various evaluations were made on the obtained thermoplastic polyurethane pellets and molded articles therefrom, in the same manner.

The results obtained are shown in Tables 3 and 4.

COMPARATIVE EXAMPLE 3

Example 1 was repeated except that the PMPA of which the titanium-based esterification catalyst had not been deactivated (PMPA-C) was used as it was (without addition of a tin compound) and that the composition of raw materials was changed as shown in Table 3, to conduct continuous melt polymerization, pelletization and drying, to obtain pellets of a thermoplastic polyurethane. Various evaluations were made on the pellets and molded articles therefrom, in the same manner.

The results obtained are shown in Tables 3 and 4.

COMPARATIVE EXAMPLE 4

An attempt was made, following the procedure of Example 6 except for using the PMPA (PMPA-D) obtained in Reference Example 5 as it was (without addition of a tin compound), to conduct continuous melt polymerization, i.e. to feed PMPA, BD and MDI continuously through metering pumps in such amounts as to make the molar ratio thereof 1:2.5:3.52 and in a total rate of 270 g/min. However, the extruded strand could not be taken up at all.

The feed rate of the raw materials was then decreased to 100 g/min, whereby the pelletization became possible. The pellets were dried in the same manner. Various evaluations were made on the obtained thermoplastic polyurethane pellets and molded articles therefrom, in the same manner.

The results obtained are shown in Tables 2 through 4.

COMPARATIVE EXAMPLE 5

A PMPA composition was obtained by adding 80 ppm (27 ppm as converted into tin atom) of dibutyltin diacetate to the PMPA (PMPA-D) obtained in Reference Example 5. The obtained PMPA composition (hereinafter referred to as "PMPA composition J") had a reaction rate constant of 7.1 l/mole·min.

Example 6 was repeated except that the PMPA composition J was used, to conduct continuous melt polymerization, pelletization and drying, to obtain pellets of a thermoplastic polyurethane. Various evaluations were made on the pellets and molded articles therefrom in the same manner.

The results obtained are shown in Tables 2 through 4.

REFERENCE EXAMPLE 6

A reaction vessel was charged with 3,000 g of 3-methyl-1, 5-pentanediol and 3,760 g of azelaic acid, and esterification was effected at 200° C. under atmospheric pressure while the water that formed was being distilled off from the reaction zone. When the acid value of the reaction mixture decreased down below 30, 90 mg of tetraisopropyl titanate was added and reaction was allowed to proceed further, under a reduced pressure of 200 to 100 mmHg. When the acid value reached 1.0, the degree of vacuum was gradually increased by a vacuum pump, to complete the reaction. As a result, 5,700 g of a PMAZ having an acid value of 0.1 and a number average molecular weight of 2,000 was obtained (hereinafter this PMAZ is referred to as "PMAZ-A").

The PMAZ had a reaction rate constant of 0.55 l/mole·min.

REFERENCE EXAMPLE 7

One thousand (1,000) grams of the PMAZ-A obtained in Reference Example 6 was heated to 100° C. After addition of 20 g (2% by weight) of water, heating was continued with stirring for 2 hours, to deactivate the titanium-based esterification catalyst, and then the water was distilled off under reduced pressure. The thus obtained PMAZ (hereinafter referred to as "PMAZ-B") had a reaction rate constant of 0.09 l/mole·min.

EXAMPLE 7

A PMAZ composition was obtained by adding 12 ppm (4.1 ppm as converted into tin atom) of dibutyltin diacetate to the PMAZ (PMAZ-B) obtained in Reference Example 7. The obtained PMAZ composition (hereinafter referred to as "PMAZ composition C") had a reaction rate constant of 1.5 l/mole·min.

Continuous melt polymerization was conducted at a temperature of 240° to 250° C. by feeding through metering pumps to a 30-φ same-direction twin-screw extruder with an L/D of 36, the PMAZ composition C heated at 80° C., 1,4-butanediol (BD) heated at 80° C. and MDI heat melted at 50° C., in such amounts as to make the molar ratio (PMAZ:BD:MDI) 1:2:3.09. The thermoplastic polyurethane melts that formed were directly fed to a spinning machine, and spun at a spinning temperature of 220° C., a dew point of cooling air of 10° C. and a spinning speed of 500 m/min, into a 40 denier/1 filament elastic polyurethane filament, which was wound up on several bobbins.

The filament was heat treated at 90° C. under a humidity of a dew point of −30° C. for 24 hours, and then allowed to stand under a humidity of 50% and at 25° C. for 3 days. Thereafter, the filament was tested for various properties.

Separately, one of the bobbins having taken up the elastic filament was allowed to stand at 25° C., 50% RH (relative humidity) for 24 hours and the filament was tested for inherent viscosity. Another bobbin was dried at 40° C. under a reduced pressure for 3 hours, and the polyurethane of the elastic filament and that obtained by kneading the polyurethane at 220° C. for 60 minutes in a melted state were each subjected to alkaline hydrolysis, to yield hard segments, which were then analyzed by GPC. The retention ratio when heat melted of long-chain hard segments was thus obtained.

The results obtained are shown in Tables 2, 5 and 6.

EXAMPLE 8

Example 7 was repeated except that the spinning was conducted at a spinning speed of 800 m/min, to conduct polymerization and spinning. The elastic polyurethane filament obtained was tested for properties.

The results obtained are shown in Tables 5 and 6.

EXAMPLE 9

A PMAZ composition was obtained by adding 10 ppm (1.9 ppm as converted into tin atom) of dibutyltin dilaurate to the PMAZ (PMAZ-B) obtained in Reference Example 7. The obtained PMAZ composition (hereinafter referred to as "PMAZ composition D") had a reaction rate constant of 0.8 l/mole·min.

Example 7 was repeated except that the PMAZ composition D was used, to conduct polymerization and spinning. The elastic polyurethane filament obtained was tested for properties.

The results obtained are shown in Tables 2, 5 and 6.

EXAMPLE 10

A PMPA composition was obtained by adding 10 ppm (3.4 ppm as converted into tin atom) of dibutyltin diacetate to the PMPA (PMPA-B) obtained in Reference Example 2. The obtained PMPA composition (hereinafter referred to as "PMPA composition K") had a reaction rate constant of 2.0 l/mole·min.

Example 7 was repeated except that the PMPA composition K was used, to conduct polymerization and spinning. The elastic polyurethane filament obtained was tested for properties.

The results obtained are shown in Tables 2, 5 and 6.

EXAMPLE 11

A PMPA composition was obtained by adding 5 ppm (1.7 ppm as converted into tin atom) of dibutyltin diacetate to the PMPA (PMPA-B) obtained in Reference Example 2. The obtained PMPA composition (hereinafter referred to as "PMPA composition L") had a reaction rate constant of 1.1 l/mole—min.

Example 7 was repeated except that the PMPA composition L was used, to conduct polymerization and spinning. The elastic polyurethane filament obtained was tested for properties.

The results obtained are shown in Tables 2, 5 and 6.

COMPARATIVE EXAMPLE 6

Example 7 was repeated except that the PMAZ (PMAZ-A) obtained in Reference Example 6 was used as it was (without addition of a tin compound), to conduct polymerization and spinning. The elastic polyurethane filament obtained was tested for properties.

The results obtained are shown in Tables 5 and 6.

COMPARATIVE EXAMPLE 7

Example 7 was repeated except that the PMAZ (PMAZ-B) obtained in Reference Example 7 was used as it was (without addition of a tin compound), to conduct polymerization and spinning. The elastic polyurethane filament obtained was tested for properties.

The results obtained are shown in Tables 5 and 6.

COMPARATIVE EXAMPLE 8

Example 7 was repeated except that the PMAZ (PMAZ-A) obtained in Reference Example6 was used as it was (without addition of a tin compound) and that the spinning speed was changed to 800 m/min, to conduct polymerization and spinning. The elastic polyurethane filament obtained was tested for properties.

The results obtained are shown in Tables 5 and 6.

COMPARATIVE EXAMPLE 9

Example 7 was repeated except that the PMAZ (PMAZ-B) obtained in Reference Example 7 was used as it was (without addition of a tin compound) and that the spinning speed was changed to 800 m/min, to conduct polymerization and spinning. The elastic polyurethane filament obtained was tested for properties.

The results obtained are shown in Tables 5 and 6.

COMPARATIVE EXAMPLE 10

A PMAZ composition was obtained by adding 100ppm (33.8 ppm as converted into tin atom) of dibutyltin diacetate to the PMAZ (PMAZ-B) obtained in Reference Example 7. The obtained PMAZ composition (hereinafter referred to as "PMAZ composition E") had a reaction rate constant of 9.2 l/mole·min.

Example7 was repeated except that the PMAZ composition E was used and that the spinning speed was changed to 800 m/min, to conduct polymerization and spinning. The elastic polyurethane filament obtained was tested for properties.

The results obtained are shown in Tables 2, 5 and 6.

TABLE 2

| | Polyester diol | | Deactivation | Tin compound | | | Reaction rate |
| --- | --- | --- | --- | --- | --- | --- | --- |
| | | | | | Amt. added (based on polyester diol) | | |
| | Type | Number average molecular weight | of titanium-based catalyst | Type | Compound (ppm) | Ti-atom (ppm) | constant k (1/mole · min) |
| Ref. Ex. 1 | PMPA-A | 2,000 | no | — | — | — | 0.5 |
| 2 | PMPA-B | 2,000 | yes | — | — | — | 0.08 |
| 3 | PBA-B | 2,000 | yes | — | — | — | 0.1 |
| 4 | PMPA-C | 5,000 | no | — | — | — | 0.3 |
| 5 | PMPA-D | 5,000 | yes | — | — | — | 0.05 |
| 6 | PMAZ-A | 2,000 | no | — | — | — | 0.55 |
| 7 | PMAZ-B | 2,000 | yes | — | — | — | 0.09 |
| Ex. 1 | PMPA Comp. E | 2,000 | yes | DBA | 3 | 1.0 | 0.5 |
| 2 | PMPA Comp. F | 2,000 | yes | DBL | 10 | 1.9 | 0.9 |
| 3 | PBA Comp. C | 2,000 | yes | DBA | 5 | 1.7 | 0.8 |
| 4 | PMPA Comp. G | 5,000 | yes | DBA | 15 | 5.1 | 0.8 |
| 5 | PMPA Comp. H | 5,000 | yes | DBL | 25 | 4.7 | 1.0 |
| 6 | PMPA Comp. I | 5,000 | yes | DBA | 40 | 13.5 | 3.0 |
| 7 | PMAZ Comp. C | 2,000 | yes | DBA | 12 | 4.1 | 1.5 |
| 9 | PMAZ Comp. D | 2,000 | yes | DBL | 10 | 1.9 | 0.8 |
| 10 | PMPA Comp. K | 2,000 | yes | DBA | 10 | 3.4 | 2.0 |
| 11 | PMPA Comp. L | 2,000 | yes | DBA | 5 | 1.7 | 1.1 |
| Comp. Ex. 5 | PMPA Comp. J | 5,000 | yes | DBA | 80 | 27 | 7.1 |
| 10 | PMAZ Comp. E | 2,000 | yes | DBA | 100 | 33.8 | 9.2 |

TABLE 3

| | Polyurethane production conditions | | | | Polyurethane pellets | | | |
| --- | --- | --- | --- | --- | --- | --- | --- | --- |
| | | | | | | | Retention | |
| | Polyester diol (mole ratio) | MDI (mole ratio) | BD (mole ratio) | Feed rate (g/min) | Sn content (Sn-atom) (ppm) | $\eta_{inh}$ *1 (dl/g) | Long-chain HS content (%) | ratio when heat melted (%) | R.R. of $\eta_{inh}$ (%) *2 |
| Ex. 1 | PMPA Comp. E (1) | (4.01) | (3) | 300 | 0.61 | 1.08 | 70 | 95 | 90 |
| 2 | PMPA Comp. F (1) | (4.01) | (3) | 300 | 1.16 | 1.05 | 70 | 94 | 92 |
| 3 | PBA Comp. C (1) | (4.2) | (3.2) | 300 | 1.02 | 1.00 | 75 | 92 | 89 |
| 4 | PMPA Comp. G (1) | (4.72) | (3.7) | 270 | 3.92 | 1.20 | 73 | 95 | 91 |
| 5 | PMPA Comp. H (1) | (3.8) | (2.8) | 270 | 3.79 | 1.03 | 68 | 96 | 92 |
| 6 | PMPA Comp. I (1) | (3.52) | (2.5) | 270 | 11.06 | 1.15 | 62 | 89 | 96 |
| Comp. Ex. 1 | PMPA-A (1) | (4.01) | (3) | 300 | 0 | 1.03 | 66 | 68 | 87 |
| 2 | PMPA-B (1) | (4.01) | (3) | 200 | 0 | 0.85 | 68 | 96 | 70 |
| 3 | PMPA-C (1) | (4.72) | (3.7) | 270 | 0 | 0.99 | 64 | 70 | 87 |
| 4 | PMPA-D (1) | (3.52) | (2.5) | 100 | 0 | 0.78 | 61 | 95 | 65 |
| 5 | PMPA Comp. J (1) | (3.52) | (2.5) | 270 | 22.11 | 1.07 | 59 | 75 | 94 |

Notes
*1: inherent viscosity;
*2: retention ratio of inherent viscosity when melt treated.

TABLE 4

| | Injection molded articles | | | | | | | | |
|---|---|---|---|---|---|---|---|---|---|
| | Inherent viscosity (dl/g) | Hardness | Strength (kg/cm²) | Elongation (%) | Deformation when molded (%) | Compression set (%) | Vicat softening point (°C.) | Cold resistance Tα (°C.) | Resistance to hydrolysis (%) |
| Ex. 1 | 1.02 | 88 | 580 | 600 | 0.8 | 42 | 100 | −38 | 85 |
| 2 | 1.03 | 88 | 560 | 570 | 0.9 | 41 | 101 | −38 | 84 |
| 3 | 0.98 | 90 | 590 | 510 | 0.6 | 40 | 110 | −36 | 82 |
| 4 | 1.10 | 70 | 410 | 830 | 1.8 | 20 | 82 | −58 | 78 |
| 5 | 0.95 | 65 | 350 | 940 | 2.0 | 22 | 70 | −60 | 75 |
| 6 | 1.12 | 60 | 310 | 1080 | 2.8 | 25 | 60 | −62 | 70 |
| Comp. Ex. 1 | 0.99 | 87 | 490 | 630 | 1.8 | 75 | 70 | −35 | 65 |
| 2 | 0.71 | 87 | 440 | 520 | 0.8 | 65 | 79 | −37 | 81 |
| 3 | 0.93 | 68 | 340 | 880 | 2.7 | 50 | 60 | −53 | 56 |
| 4 | 0.72 | 59 | 200 | 1030 | 3.5 | 55 | 48 | −61 | 67 |
| 5 | 1.06 | 59 | 210 | 1100 | 4.5 | 85 | 35 | −49 | 45 |

TABLE 5

| | Production conditions for polyurethane and elastic fiber | | | | Elastic fiber | | | | |
|---|---|---|---|---|---|---|---|---|---|
| | Polyester diol (mole ratio) | MDI (mole ratio) | BD (mole ratio) | Spinning speed (m/min) | Sn content (Sn-atom) (ppm) | $\eta_{inh}$ *1 (dl/g) | Long-chain HS content (%) | Retention ratio when heat melted (%) | R.R. of $\eta_{inh}$ (%) *2 |
| Ex. 7 | PMAZ Comp. C (1) | (3.09) | (2) | 500 | 2.78 | 1.25 | 63 | 94 | 93 |
| 8 | PMAZ Comp. C (1) | (3.09) | (2) | 800 | 2.78 | 1.23 | 63 | 94 | 92 |
| 9 | PMAZ Comp. D (1) | (3.09) | (2) | 500 | 1.29 | 1.28 | 64 | 95 | 89 |
| 10 | PMPA Comp. K (1) | (3.09) | (2) | 500 | 2.30 | 1.30 | 61 | 89 | 90 |
| 11 | PMPA Comp. L (1) | (3.09) | (2) | 500 | 1.15 | 1.21 | 61 | 90 | 88 |
| Comp. Ex. 6 | PMAZ-A (1) | (3.09) | (2) | 500 | 0 | 1.15 | 54 | 64 | 89 |
| 7 | PMAZ-B (1) | (3.09) | (2) | 500 | 0 | 1.05 | 64 | 96 | 75 |
| 8 | PMAZ-A (1) | (3.09) | (2) | 800 | 0 | 1.18 | 55 | 63 | 88 |
| 9 | PMAZ-B (1) | (3.09) | (2) | 800 | 0 | 0.98 | 61 | 93 | 74 |
| 10 | PMAZ Comp. E (1) | (3.09) | (2) | 800 | 22.9 | 1.31 | 57 | 70 | 96 |

Notes
*1: inherent viscosity;
*2: retention ratio of inherent viscosity when melt treated.

TABLE 6

| | Elastic fiber | | | | | | |
|---|---|---|---|---|---|---|---|
| | Strength (g/d) | Elongation (%) | Elastic recovery ratio (%) | Hot water resistance R (g/80 d) | Hot water resistance S (%) | Resistance to hydrolysis (%) | Filament breakage rate |
| Ex. 7 | 1.5 | 480 | 95 | 1.6 | 65 | 91 | O |
| 8 | 1.6 | 450 | 95 | 1.7 | 64 | 92 | O |
| 9 | 1.6 | 470 | 94 | 1.6 | 65 | 90 | O |
| 10 | 1.4 | 480 | 92 | 1.3 | 70 | 74 | O |
| 11 | 1.5 | 460 | 93 | 1.3 | 69 | 75 | O |
| Comp. Ex. 6 | 1.0 | 440 | 85 | 0.5 | 80 | 55 | X |
| 7 | 1.2 | 450 | 95 | 1.2 | 66 | 91 | Δ |
| 8 | 0.9 | 410 | 80 | 0.6 | 81 | 58 | X |
| 9 | 1.0 | 390 | 90 | 1.0 | 70 | 85 | X |
| 10 | 1.0 | 490 | 90 | 0.7 | 78 | 59 | X |

As is understood from Tables 2 through 6, thermoplastic polyurethanes containing no tin compound and obtained by urethanization polymerization using a polymer diol with the titanium-based esterification catalyst having been not deactivated, give injection molded articles and elastic fibers which are inferior in heat resistance (Vicat softening point) and resistance to hydrolysis (compare Examples 1 and 2 with Comparative Example 1, Examples 4 through 6 with Comparative Example 3 and Examples 7 through 9 with Comparative Examples 6 and 8).

It is also understood that the use of a polymer diol with the titanium-based esterification catalyst having been deactivated, in urethanization polymerization in the absence of a tin compound, causes the productivity for polyurethane to become low, the resulting polyurethane to have a low molecular weight (inherent viscosity), thereby achieving only a small increase in molecular weight after being injection molded, and to give molded articles being inferior in strength, compression set and like properties (Comparative Examples 2 and 4). This type of polyurethane causes, upon preparation of elastic polyurethane fibers, frequent filament breakage, which is more serious when the spinning speed becomes higher (Comparative Examples 7 and 9).

The following is also understood. Even with a thermoplastic polyurethane composition obtained by urethanization polymerization in the presence of a tin compound and using a polymer diol with the titanium-based esterification catalyst having been deactivated, if the content of the tin compound exceeds 15 ppm as converted into tin atom, molded articles from the thermoplastic polyurethane composition are inferior in strength, compression set, heat resistance (Vicat softening point) and resistance to hydrolysis (Comparative Example 5). Further in this case, upon production of elastic fibers from the thermoplastic polyurethane composition, the filament breakage rate becomes high and the obtained elastic filaments are also poor in strength, hot water resistance and resistance to hydrolysis (Comparative Example 10).

Industrial applicability

The thermoplastic polyurethane compositions according to the present invention have excellent moldability and give molded products being excellent in tensile strength and elongation, compression set, resistance to hydrolysis and like properties. Thanks to these features, the thermoplastic polyurethane compositions are applicable to a wide variety of end-uses, such as sheets, films, rolls, gears, solid tires, belts, hoses, tubes, packings, air bags, wrist straps, shockproof materials, shoe soles, sports shoes, machine parts, automobile parts, sporting goods and artificial leathers.

The thermoplastic polyurethane compositions according to the present invention also have excellent spinnability and give fibers having excellent hot water resistance, resistance to hydrolysis, unwindability and like properties, and are hence also useful as materials for elastic fibers. resistance to hydrolysis, unwindability and like properties, and are hence also useful as materials for elastic fibers.

What is claimed is:

1. A process for producing thermoplastic polyurethane compositions, which comprises:
   a) producing a polymeric diol by esterification polymerization with a titanium-containing esterification catalyst;
   b) deactivating said titanium-containing esterification catalyst by the steps of:
      (1) heating the polymeric diol containing the titanium-containing esterification catalyst at a temperature and in the presence of an amount of water effective to decrease the activity of said catalyst; or
      (2) adding a phosphorus compound to the polymeric diol containing the titanium-containing esterification catalyst; and
   c) conducting melt polymerization of said polymeric diol with an organic diisocyanate and a chain extender, in the presence of a tin compound.

2. The process of claim 1, wherein said step b) comprises decreasing the activity of said titanium-containing esterification catalyst by heating the same at a temperature and in the presence of an amount of water effective to decrease the activity of said catalyst and continuing said melt polymerization.

3. The process of claim 2, wherein said titanium-containing esterification catalyst is heated with said water at a temperature in the range of about 70° C. to 150° C.

4. The process of claim 1, wherein said step b) comprises decreasing the activity of said titanium-containing esterification catalyst by adding a phosphorus compound thereto.

5. The process of claim 4, wherein said phosphorus compound is selected from the group consisting of phosphoric acid, a phosphoric acid ester, phosphorous acid and a phosphorous acid ester.

6. The process of claim 1, wherein said polymeric diol is selected from the group consisting of polyester diols, polyester-polycarbonate diols and polycarbonate diols having a number average molecular weight of from about 500 to 10,000.

7. The process of claim 1, wherein said titanium-containing esterification catalyst is selected from the group consisting of titanic acid, tetraalkoxy titanium compounds, titanium acylate compounds and titanium chelate compounds.

8. The process of claim 7, wherein said tetraalkoxy titanium compounds are selected from the group consisting of tetraisopropyl titanate, tetra-n-butyl titanate, tetra-2-ethylhexyl titanate and tetrastearyl titanate.

9. The process of claim 7, wherein said titanium acylate compounds are selected from the group consisting polyhydroxyltitanium stearate and polyisopropoxytitanium stearate.

10. The process of claim 7, wherein said titanium chelate compounds are selected from the group consisting of titanium acetylacetonate, triethanolamine titanate, titanium ammonium lactate, titanium ethyllactate and titanium octyleneglycolate.

11. The process of claim 1, wherein said titanium-containing esterification catalyst is used in the amount of 0.1 to 50 ppm based on a sum of the amounts of dicarboxylic acid a and short-chain diol a used to prepare said polymeric diol, wherein the short-chain diol is an aliphatic diol selected from the group consisting of ethylene glycol, diethylene glycol, triethylene glycol, propylene glycol, 1,4-butanediol, neopentyl glycol, 1,5-pentanediol, 3-methyl-1,5-pentanediol, 1,6-hexanediol, 1,8-octanediol, 2-methyl-1,8-octanediol, 1,9-nonanediol and 1,10-decanedol; an alicyclic diol selected from the group consisting of cyclohexanedimethanol and cyclohexanediol; or an aromatic dihydric alcohol selected from the group consisting of metaxylylene glycol, para-xylylene glycol, bishydroxyethoxybenzene and bishydroxyethyl terephthalate; or a mixture thereof.

12. The process of claim 11, wherein the amount of said titanium-containing esterification catalyst used is from about 1 to 30 ppm based on the sum of the amounts of dicarboxylic acid and short-chain diol used to prepare said polymeric diol.

13. The process of claim 1, wherein said organic diisocyanate is selected from the group consisting of an aromatic diisocyanate and an alicyclic diisocyanate.

14. The process of claim 13, wherein said aromatic diisocyanate is selected from the group consisting of 4,4'-diphenylmethane diisocyanate, p-phenylene diisocyanate, tolylene diisocyanate, 1,5-naphthalene diisocyanate and xylylene diisocyanate.

15. The process of claim 14, wherein said aromatic diisocyanate is 4,4' diphenylmethane diisocyanate.

16. The process of claim 13, wherein said alicyclic diisocyanate is selected from the group consisting of isophorone diisocyanate and 4,4'-dicyclohexyl diisocyanate.

17. The process of claim 1, wherein said tin compound is selected from the group consisting of tin octylate, monomethyltin mercaptoacetate, monobutyltin triacetate, monobutyltin monooctylate, monobutyltin monoacetate, monobutyltin maleate, monobutyltin maleic acid benzyl ester salts, monooctyltin maleate, monooctyltin thiodipropionate, monooctyltin tris(isooctyl thioglycolic acid esters), monophenyltin triacetate, dimethyltin maleic acid ester salts, dimethyltin bis(ethylene glycol monothioglycolate), dimethyl tin bis(mercaptoacetic acid) salt, dimethyltin bis(3-mercaptopropionate), dimethyltin bis(isooctyl mercaptoacetate), dibutyltin disterate, dibutyltin dilaurate, dibutyltin maleate, dibutyltin maleate polymer, dibutyltin maleic acid ester salts, dibutyltin bis(mercaptoacetic acid), dibutyltin (3-mercaptopropionic acid alkoxybutyl ester) salts, dibutyltin bisoctyl thioglycol ester salts, dibutyltin (3-mercaptopropionic acid) salt, dioctyltin maleate polymer, dioctyltin dilaurate, dioctyltin bis(isooctyl mercaptoacetate), dioctyltin bis(isooctylthioglycolic acid esters) and dioctyltin bis(3-mercaptopropionate).

18. The process of claim 17, wherein said tin compound is selected from the group consisting of dibutyltin diacetate, dibutyltin dilaurate and dibutyltin (3-mercaptopropionic acid ethoxybutyl ester) salt.

* * * * *